United States Patent [19]

Tumpey

[11] Patent Number: 5,012,146
[45] Date of Patent: Apr. 30, 1991

[54] BEVELED GENERATOR SHAFT FOR IMPROVED HEAT TRANSFER

[75] Inventor: John J. Tumpey, Oakhurst, N.J.
[73] Assignee: Allied-Signal Inc., Morris Township, Morris County, N.J.
[21] Appl. No.: 447,324
[22] Filed: Dec. 7, 1989
[51] Int. Cl.⁵ .......................... H02K 9/22; F28F 9/08
[52] U.S. Cl. ................................. 310/68 D; 165/86; 310/64
[58] Field of Search ..................... 165/80.3, 86, 185; 310/64, 68 D, 90; 363/126, 145

[56]     References Cited
U.S. PATENT DOCUMENTS

| | | | |
|---|---|---|---|
| 4,144,932 | 3/1979 | Voigt | 165/86 |
| 4,353,002 | 10/1982 | Kobayashi et al. | 310/64 |
| 4,752,221 | 7/1988 | Kurihashi et al. | 310/68 D |

FOREIGN PATENT DOCUMENTS 2503561  8/1975  Fed. Rep. of Germany ........ 310/64

Primary Examiner—Steven L. Stephan
Assistant Examiner—D. L. Rebsch
Attorney, Agent, or Firm—Howard G. Massung; Robert A. Walsh

[57]     ABSTRACT

A shaft and a substrate having mating beveled sections for improved heat transfer therebetween. A shaft having a first section, a second section and a beveled section, between the first and second sections such that the second section has a smaller outer diameter than the first section, is provided for rotation within a generator. A substrate having power and heat generating components mounted thereon and a beveled inner radial surface is mounted on the shaft such that a beveled inner radial surface mates with the beveled section of the shaft to provide greater surface area where the substrate and shaft interface, so as to improve heat transfer therebetween as compared to a shaft having a diameter along its entire length equal to the second section and to permit an adjustably tighter fight. The second section of the shaft is threaded to receive a hold-down collar having a threaded inner radial surface for securing the substrate in position.

16 Claims, 2 Drawing Sheets

BEVELED GENERATOR SHAFT FOR IMPROVED HEAT TRANSFER

BACKGROUND OF THE INVENTION

This invention relates to rotating electric machinery. More specifically, it relates to an interface between a shaft and a substrate having heat generating diodes thereon for improving heat dissipation.

The present trend in generator design, particularly for airborne applications, is to require greater output power ratings while reducing the weight and volume of the generator. Due to these trends, the operation of a generator will create additional heat which must be dissipated to maintain an internal operating temperature which is conducive to performance and reliability. At the same time, the decrease in available weight and volume increases the difficulty of heat dissipation.

A generator having improved heat conduction paths for increasing the dissipation of heat from power generating components, therefore, is needed.

SUMMARY OF THE INVENTION

This invention includes apparatus within a rotating electric machine for improving heat conduction from rectifying diodes therein which are mounted on a substrate disposed about a rotating shaft. The shaft preferably has a coolant circulated through an axial bore to remove heat from various generator components. The shaft further has a first section, a second section and a beveled section located between the first and second sections such that the second section has a smaller outer diameter than the first section. At least one power (and heat) generating component, for example, a high power diode is mounted on the substrate. In a preferred embodiment, the diodes are arranged on the substrate in a full wave rectifying circuit for each AC phase available. The substrate has an inner radial surface which is beveled at the same angle as the beveled section of the shaft. The substrate is disposed about the shaft such that the beveled inner radial surface of the substrate and the beveled section of the shaft mate. In a preferred embodiment, a hold-down collar having a threaded inner radial surface is secured to threads provided on the outer surface of the second section of the shaft to secure the substrate in place.

It is an object of the present invention to provide an improved path for heat conduction from the diodes or any other heat generating components on the substrate to the shaft.

These and other objects will become more apparent with reference to the accompanying drawings and specification.

DESCRIPTION OF THE PREFERRED EMBODIMENT

Figure 1:
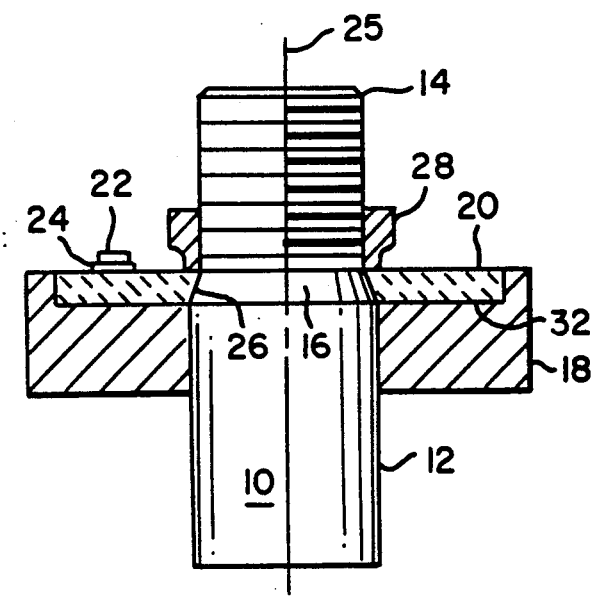
FIG. 1 is a cross section view of the shaft and the substrate of the present invention.

FIG. 1 illustrates a shaft 10 within a rotating electric machine, for example, a generator. The shaft 10 has a first section 12, a second section 14 and a beveled section 16 positioned between the first section 12 and the second section 14 such that the second section 14 has a smaller outer diameter than the first section 12. An exciter core 18 having a depression adapted for receipt of a substrate 20 is disposed about the shaft 10 for rotation therewith.

As the exciter core 18, the substrate 20 and the shaft 10 rotate together, an electrical current, preferably, three-phase is induced in AC windings wound about the poles of a rotor (not shown) which is also disposed about the shaft 10. The induced AC current is supplied to a rectifier circuit on the substrate 20 for rectification. The rectifier circuit comprises a plurality of diodes arranged in a well known bridge circuit. The rectified current typically is used within the rotating electric machine to cause the generation of an output signal.

One of the diodes 22 is illustrated in FIG. 1 mounted on a molybdenum base 24 which in turn is mounted on the substrate 20. The diodes 22 generate a large amount of heat while rectifying the induced AC current. This heat must be conducted from the diode 22 through the base 24 to the substrate 20 and then to the shaft 10 for dissipation. The heat is preferably dissipated from the shaft 10 by a coolant which circulates through the shaft 10, for example, as described in co-pending application Ser. No. 371,362 entitled ROTATING RECTIFIER ASSEMBLY, which is hereby incorporated by reference.

In a typical generator, the mating surfaces between the shaft 10 and the components which are disposed about the shaft 10 are parallel to the rotational axis (indicated by line 25) of the shaft 10. In accordance with the present invention, however, the substrate 20 has a beveled inner radial surface area 26 which mates with the beveled section 16 of the shaft 10, thereby providing a heat conducting interface between the substrate 20 and the shaft 10. The heat conducting interface of the present invention, therefore, has increased surface area which permits increased heat transfer between the substrate 20 and the shaft 10 as compared to a shaft which has a diameter equal to section 14 along its entire length. The substrate 20 is preferably secured onto the shaft 10 by a hold-down collar 28 which is threadedly engaged to threads 30 on the outer surface of the second section 14 on the shaft 10.

Figure 2:
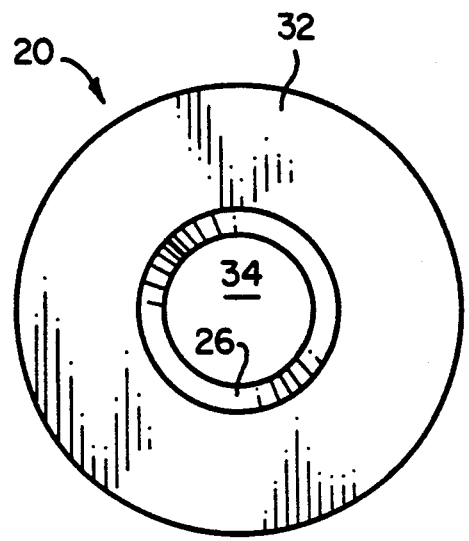
FIG. 2 illustrates the substrate of the present invention.

FIG. 2 illustrates an axial view of the substrate 20 wherein the bottom surface area 32 is viewable. The opposite side of the substrate 20, which is not shown, is covered with areas of conductive material on which the diodes 22 and the bases 24 are mounted. The substrate 20 has a hole 34 through which the second section 14 of the shaft 10 is adapted to fit. The substrate further has the beveled internal radial surface 26 which mates with the beveled section 16 on the shaft 10. The bevel angle of the second section 16 of the shaft 10 and the inner radial surface 26 of the substrate 20 should be equal such that a tight fit is provided between the two surfaces. The bevels can be created by properly positioning the substrate 20 and the shaft 10 on a lathe and machining the surfaces to machine tolerance angles. The substrate 20 is preferably soft relative to the shaft 10 and, therefore, should conform somewhat to the angle of the beveled section 16 of the shaft 10 when the hold-down collar 28 exerts pressure.

The substrate 20 preferably has good electrical insulating properties and good heat conductive properties. A preferred substrate 20 is a ceramic coated metal core substrate such as disclosed in U.S. Pat. No. 4,794,048 which is hereby incorporated by reference.

Figure 3:
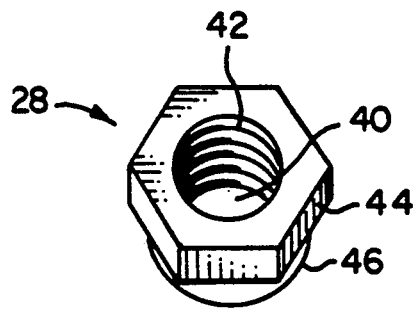
FIG. 3 illustrates the hold-down collar of the present invention.

FIG. 3 illustrates the hold-down collar 28 in greater detail. The hold-down collar 28 has a hole 40 through which the second section 14 of the shaft 10 fits. It also has a threaded inner radial surface 42 which mates with the threads 30 provided on the surface of the second section 14 of the shaft 10. An outer surface 42 is preferably shaped as an octagon for receipt of a similarly shaped tool to allow tightening of the hold-down collar 28 onto the shaft 10. The hold-down collar 28 is preferably threaded onto the shaft 10 such that a rotational acceleration of the shaft 10 causes the hold-down collar 28 to further tighten onto the shaft so as to avoid an undesired loosening of the hold-down collar 28 and a subsequent displacement of the substrate 20 in relation to the shaft 10.

This arrangement allows the hold-down collar 28 to secure the substrate 20 onto the shaft as illustrated in FIG. 1 by contacting the substrate 20 on a radial surface area on the top surface of the substrate 20. The hold-down collar 28 preferably has a tapered outer surface 46 to minimize the contacted surface area on the substrate 20, thereby allowing maximum usage of the top surface area on the substrate 20, for example, for conductive paths and componentry. The pressure provided on the substrate 20 by the hold-down collar 28 improves the mating of the radial beveled surface area 26 of the substrate 20 and the beveled section 16 of the shaft 10.

Figure 4:
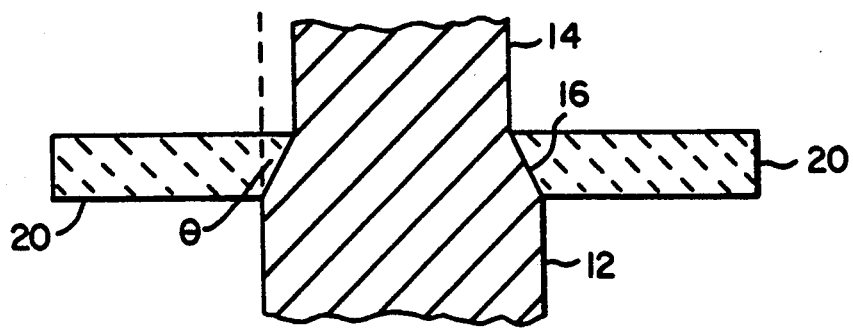
FIG. 4 illustrates a cross sectional area of the shaft and the substrate in accordance with a preferred embodiment.

In preferred embodiments of the present invention, the angle, Θ, formed by the surface of the beveled section 16 with the surface of the first section 12 (see FIG. 4) is in the range of 10 to 45 degrees. In a most preferred embodiment, as illustrated in FIG. 4, the substrate 20 has an axial thickness of 0.205 inches. The outer diameter of the second section 14 is 1.427 inches and the outer diameter of the first section 12 of the shaft is 1.499 inches. The outer surface area of the beveled section 16 of the shaft, therefore, forms an angle with the axial line 50 of approximately 19°. Although the above angles are preferred, almost any angle can be provided. By increasing the angle, the mating surface areas between the substrate 20 and the shaft 10 is maximized, thereby maximizing the heat conduction path between the substrate 20 and the shaft 10. At the same time, however, the shaft outer diameters are designed in view of the generator speed range and the shaft's critical speed. Generally, it is desirable to maximize the size of the second section of the shaft 10 so as to increase the overall strength of the shaft. These parameters are varied in accordance with the particular dimensions and specifications necessary to obtain the desired performance of a generator.

Figure 5:
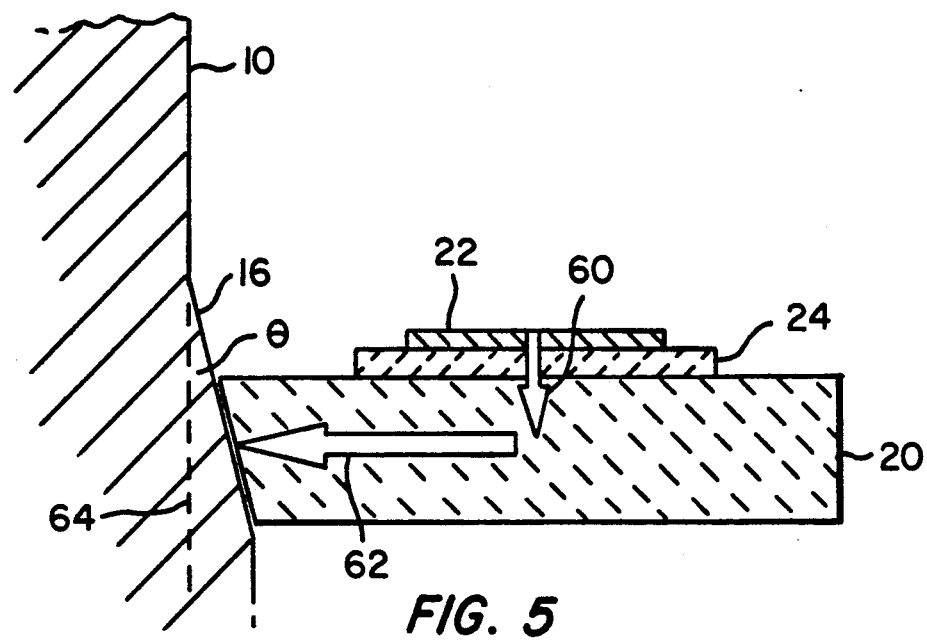
FIG. 5 is a heat flow diagram illustrating heat conduction paths.

FIG. 5 illustrates a heat flow model for the substrate 20 and the shaft 10 of the present invention. Heat from the diode 22, represented by the arrow 60, is transferred into the substrate 20 through the base 24. The substrate 20 transfers the heat indicated by the arrow 62 to the shaft 10. As mentioned before, the interface between the surfaces of a substrate and a shaft in prior generators have been parallel to the rotational axial line 25 of the shaft 10. The present invention, by beveling the mating surface areas, increases the heat flow between the substrate 20 and the shaft 10 in accordance with the increased mating surface as compared to the mating surface area of a shaft having a diameter equal to the narrower section 14.

Figure 6:
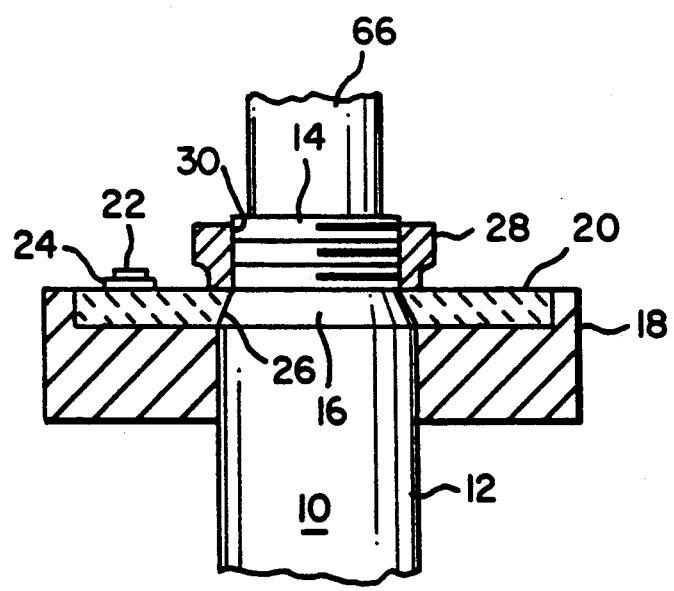
FIG. 6 illustrates a cross-section view of an alternate embodiment of the present invention.

FIG. 6 illustrates an alternate embodiment of the present invention wherein a third section 66 of the shaft 10 is provided adjacent the second section 14. The third section has a smaller outer diameter than the second section 14 so as to allow the hold-down collar 28 to slide over the third section so as to engage the threads 30 on the second section of the shaft 10.

The present invention offers other advantages over pair shaft-substrate interfaces. For example, in a typical generator, rotating components are secured to a shaft by means of a heat shrink interference fit which provides a tight mating interface. A heat shrink interference fit, however, can overstress the rotating components during the required heating and cooling processes, thereby causing fatigue points. The present invention does not require any heating or cooling of the components and, therefore, avoids such fatigue points.

We claim:

1. An electric machine which generates an output signal from an exciter signal, comprising:
   a shaft having a first section, a second section and a beveled section between said first and second sections, said second section having a smaller outer diameter than said first section;
   a substrate having an internal radial surface which is angled similarly to said beveled section of said shaft
   at least one heat dissipating component mounted on said substrate which generates the exciter signal; and
   means secured to said shaft for securing said substrate onto said shaft such that said beveled internal radial surface of said substrate mates with said beveled section of said shaft to provide a heat conduction path for said substrate to said shaft.

2. The electric machine as claimed in claim 1, wherein said beveled section is angled away from an axial line along a surface of said first section of said shaft within the range of 10 to 45 degrees.

3. The electric machine as claimed in claim 2, wherein said angle is 19°.

4. The electric machine as claimed in claim 1, wherein said means to secure said substrate to said shaft is a hold-down collar having a threaded inner radial surface which mates with a threaded outer radial surface on said second section of said shaft.

5. The electric machine as claimed in claim 4, wherein said hold-down collar threadedly engages said shaft such that a rotational acceleration of said shaft tightens said hold-down collar onto said shaft.

6. The electric machine as claimed in claim 4, wherein an outer surface of said hold-down collar is shaped for receipt of a tool whereby said hold-down collar can be tightened onto said shaft.

7. The electric machine as claimed in claim 1, wherein said hold-down collar contacts a top axial surface area on said substrate near an inner diameter of said substrate.

8. The electric machine as claimed in claim 1, wherein said shaft has an axial bore through which a coolant can be circulated.

9. The electric machine as claimed in claim 1, wherein said substrate is softer than said shaft such that said internal radial surface of said substrate conforms to said beveled section of said shaft.

10. The electric machine as claimed in claim 4, wherein said shaft has a third section adjacent said threaded second section, said third section having a smaller outer diameter than said second section.

11. The electric machine as claimed in claim 10, wherein said means to secure said substrate to said shaft is a hold-down collar having a threaded inner radial surface which mates with a threaded outer radial surface on said second section of said shaft.

12. The electric machine as claimed in claim 10, wherein said hold-down collar threadedly engages said shaft such that a rotational acceleration of said shaft tightens said hold-down collar onto said shaft.

13. The electric machine as claimed in claim 10, wherein said shaft has an axial bore through which a coolant can be circulated.

14. The electric machine as claimed in claim 10, wherein said substrate is softer than said shaft such that said internal radial surface of said substrate conforms to said beveled section of said shaft.

15. The electric machine as claimed in claim 1, wherein said heat dissipating component is a diode.

16. The electric machine as claimed in claim 15, further comprising a plurality of diodes arranged in a full wave rectifier bridge.

* * * * *